United States Patent [19]

White

[11] 4,318,122

[45] Mar. 2, 1982

[54] ELECTRONIC COLOR SEPARATION

[75] Inventor: James M. White, Mint Hill, N.C.

[73] Assignee: International Business Machines Corporation, Armonk, N.Y.

[21] Appl. No.: 194,208

[22] Filed: Oct. 6, 1980

[51] Int. Cl.³ .......................... H04N 1/46; H04N 3/15
[52] U.S. Cl. ........................................ 358/41; 358/43; 358/44; 358/75
[58] Field of Search ....................... 358/41, 43, 44, 48, 358/53, 55, 75, 76, 209, 212, 213, 225, 226, 256, 285

[56] References Cited

U.S. PATENT DOCUMENTS 3,619,061 11/1971 Mitchell ................................. 356/85
3,922,711 11/1975 Sasabe et al. ......................... 358/75
4,102,776 3/1977 Mrdjen ................................. 358/75

FOREIGN PATENT DOCUMENTS 55-30214 3/1980 Japan ..................................... 358/75
55-30215 3/1980 Japan ..................................... 358/75
55-53966 4/1980 Japan ..................................... 358/75

OTHER PUBLICATIONS

IBM Technical Disclosure Bulletin, vol. 20, No. 1, pp. 436 and 437, SOLID-STATE FET COLOR SCANNER, by S. G. Chamberlain and D. L. Critchlow.

Primary Examiner—Michael A. Masinick
Attorney, Agent, or Firm—E. Ronald Coffman

[57] ABSTRACT

Fluorescent bulbs having two phosphors emitting different colors with different persistence are used to illuminate a target object with sequentially different predetermined mixtures of light from which color separated images can be taken.

8 Claims, 4 Drawing Figures

ELECTRONIC COLOR SEPARATION

The separation of a colored image into components of primary colors is normally accomplished through the use of separate filters or light sources for each of the primary colors to measure the reflectance of the image on a point-by-point basis for light of each primary color.

An object of my invention is to provide for three-color separation through the use of two lamps and without the use of filters.

Another object of my invention has been to provide a color scanner that is particularly suited for use with an elongated charge transfer image pickup device.

SUMMARY OF THE INVENTION

These objects are achieved by the use of fluorescent lamps having a mixture of phosphors that produce different colors and have significantly different persistence. Thus, a fluorescent lamp having blue phosphors of very short persistence and red phosphors of long persistence will, when energized, provide light that is a mixture of red and blue. Immediately after the lamp is de-energized, the red light will remain, due to the greater persistence of the red phosphors. A target, thus, is sequentially illuminated, first with a red/blue light mixture and, second, by just the red component of the mixture. By subtracting the reflectance of the target under red light from that under the mixture of red and blue light, the reflectance of the object under pure blue light can be ascertained.

The addition of an alternately energized second lamp, having a single phosphor, e.g., green or yellow/green, provides the three primary colors necessary for a full-color image lift.

Alternately, a single lamp can provide the information for a two-color image detection.

My invention provides an arrangement of a pair of tubular fluorescent bulbs which is especially well suited to provide a symmetrical light source for an elongated image-sensing array such as those using charge transfer for solid state scanning. One lamp is simply positioned on either side of the optical path through which a line of the image is projected to the scanning array. With my arrangement, the color separation becomes completely electronic in both the control of the lamps and separation of the resultant signals.

These and other objects, features and advantages of my invention will be apparent to those skilled in the art from the following description of a preferred illustrative embodiment wherein reference is made to the accompanying drawings, of which FIG. 1 is a diagrammatic view of a color separation scanning apparatus constructed in accordance with my invention;

Figure 1:
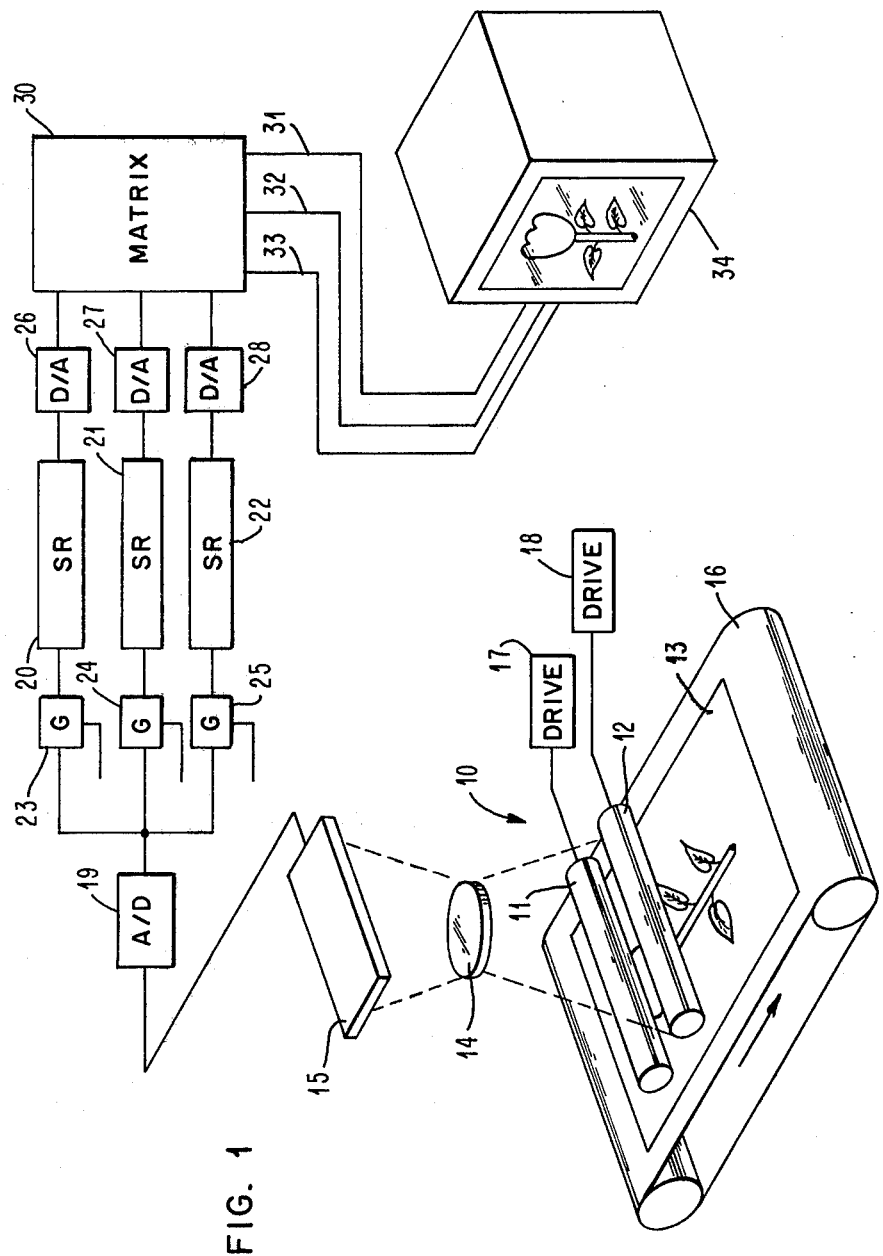

In FIG. 1, there is shown a scanner 10, including a pair of illumination lamps 11 and 12, positioned adjacent a scanning or target region to illuminate an elemental line of a document 13. An optical lens system 14, directed at the scanning region of document 13, focuses an image of the elemental line onto the light sensitive points of a solid state linear array photosensor or transducer 15. The details of photosensor 15 are not critical to this invention, and any relatively panchromatic photosensitive array, such as a charge-coupled device of the type commercially known as CCD, will be suitable. A conveyor 16 moves the document 13 past the scanning region so that successive lines are presented to photosensor 15.

In accordance with my invention, the envelope of lamp 11 is coated with a mixture of red and blue phosphors. Suitable phosphors would include Sylvania Type No. 290 which is calcium metasilicate: Mn: Pb which produced red light peaking at 615 nanometers and having a slow decay time of $3.2 \times 10^{-2}$ sec., and Sylvania Type No. 243 which is Strontium Pyrophosphate: Sn which produced blue light peaking at 460 nanometers and having a fast decay time of $6.7 \times 10^{-6}$ sec. The envelope of lamp 12 is coated with yellow/green phosphor; for example, Sylvania Type No. 250 which is Strontium Halophosphate: Sb:Mn which produces yellow/green light, peaking at 578 nanometers and having a fast decay time of $1.2 \times 10^{-5}$ sec.

The characteristic of the red phosphors is to provide a relatively long persistence, such that in the presence of an alternating lamp excitation current, the red output remains relatively constant. In distinction to this long persistence, the green and especially the blue phosphors tend to produce a light output that closely parallels the changes in excitation current. Thus, the document 13 will be illuminated with a mixture of red and blue light when lamp 11 alone is driven, and will be illuminated with a mixture of green and persisting red light when lamp 12 alone is driven. For a short period following termination of either drive pulses to lamps 11 and 12, the document will be illuminated essentially by red light persisting from lamp 11. My invention employs these different mixtures of light or light output modes to provide color separation, using a single photosensor array 15 and only electronically activated controls.

Figure 2:
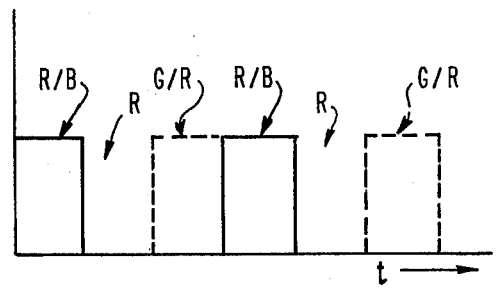
FIG. 2 is an explanatory graph illustrating a simplified time sequence of operation of the apparatus of FIG. 1.

Each elemental line of document 13 will be subjected to a scanning or activating cycle consisting of three sub-cycles or light mixture output modes defined by lamp driving circuits 17 and 18. In FIG. 2, these are shown as R/B (red/blue) when lamp 11 is on, R (red) when both lamps are off, and G/R (green/red) when lamp 12 is on. During each sub-cycle, a photosensor image of the line will be formed as electrostatic charge packets in the photosensor 15 for each picture element or pel along the line. Each charge packet is delivered as a pulse to a analog-to-digital converter 19, whereby its analog magnitude is represented in terms of a binary word. For example, a 6-bit binary word would represent the reflected light intensity on a scale between 0 and 63.

The digitized value of each pel is set into an appropriate one of three shift registers 20, 21 and 22, which correspond respectively to the three illumination modes of the lamps 11 and 12. Selection of the shift registers is controlled by their associated gates 23, 24 and 25. The three reflectance value words relating to a single pel are brought through digital-to-analog converters 26, 27 and 28 to computational circuitry 30 for simultaneous processing.

Circuitry 30 essentially subtracts the reflectance value of the electronic image produced under red light, stored in shift register 21, from the value produced under the mixtures of red-and-blue and red-and-green lights, as stored in shift registers 20 and 22 respectively. The resultant values represent a basic color-separated electronic image, presented on three separate outputs 31, 32 and 33 of the circuitry 30, representing respectively the reflectivity of the document 13 of the colors blue, red and green. These signals now are suitable for the control of a color light display such as a color television display 34 for reproducing the original image, picture element by picture element.

Figure 3:
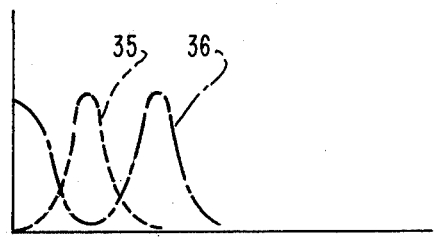
FIG. 3 is a graphical representation of a preferred lamp energization pattern for use with my apparatus in FIG. 1.
Figure 4:
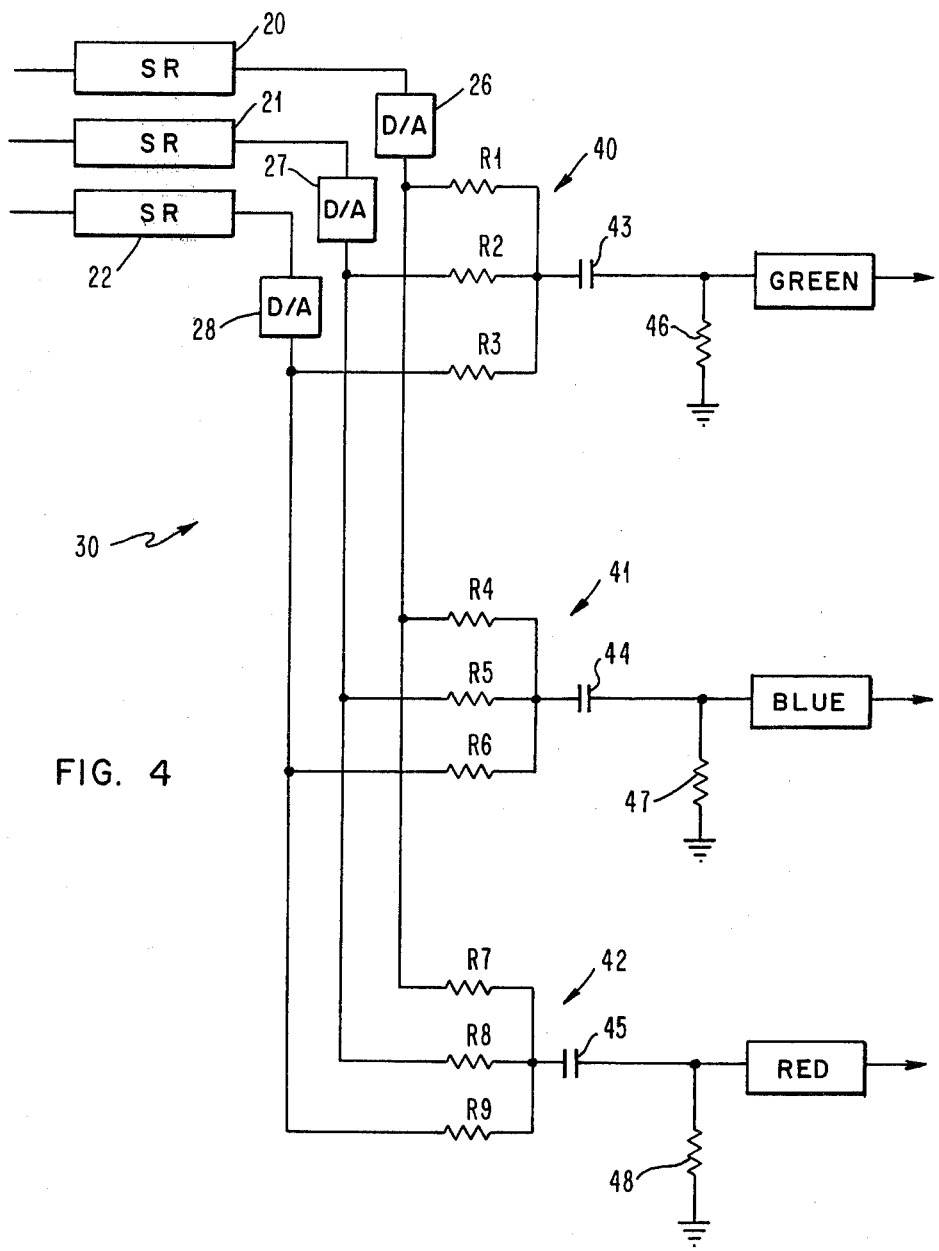
FIG. 4 is a circuit diagram of a computational matrix for separating mixed color signals of the type produced from a lamp energization pattern, as illustrated in FIG. 3.

A preferred embodiment of my invention employs lamp excitation wave forms 37 and 38, as shown in FIG. 3, for lamps 11 and 12, respectively. The excitation current wave for each lamp is preferably offset by 90°, such that lamp 11 will be driven at times when lamp 12 receives 0 driving current and, conversely, lamp 12 is driven at times when lamp 11 receives 0 driving current. Midway between the two peak driving conditions, both lamps 11 and 12 will be driven at substantially less than their peaks, and during this condition the persistent red generated by lamp 11 will be the dominant color emitted. These offset wave forms thus excite the lamps 11 and 12 to provide continually varying mixtures of light output. Photosensor 15 is sampled in synchronism with the excitation wave forms to capture the light reflection during three different light mixture output modes to produce the reflectance values to be entered into shift registers 20, 21 and 22. Since actual sampling times span intervals where all colors of light are present, even if in small amounts, I prefer to employ as computational circuitry 30 a signal-separating matrix circuit of the type well known in color television receivers. A simplified version of such a matrix is shown in FIG. 4. The matrix consists of nine resistors R1 through R9, grouped into parallel sets 40, 41 and 42. A DC blocking capacitor 43, 44 and 45 for each set, passes an algebraically combined current to a voltage signal developing resistor 46, 47 and 48.

The voltage signal thus developed is applied to the input of the three primary color amplifiers 50, 51 and 52. The resistors of each set 40, 41 and 42 receive analog voltage levels from analog-to-digital converters 26, 27 and 28, connected to the output stages of the shift registers 20, 21 and 22. Thus, analog voltage pulses, representative of the reflectance from a target object under three different light conditions, are simultaneously applied to each of the resistor sets. The resistors R1 through R9 are selected in magnitude to divide the voltages by percentages necessary to properly separate the color signals. This matrix essentially solves three simultaneous linear equations which express the light reflected from an unknown target object in response to three known light mixtures. Depending upon the mixtures of light, it may be required that one or more of the voltages applied to a particular resistor set have a negative sign, in which case a negative output is provided from the associated digital-to-analog converter 26, 27 or 28.

Those skilled in the art will appreciate that the simultaneous equations could be solved with equal facility through the use of digital computation, directly taken from the signals supplied from shift registers 20, 21 and 22. I prefer the resistor matrix disclosed, due to the simplicity of the computation involved and the ease by which this type of computation can be performed with analog circuitry.

I claim:

1. A color separation scanner comprising an optical system for focusing an image of a target region onto a photosensitive transducer for producing an electronic image of the light received thereby, wherein the improvement comprises:
    a fluorescent lamp positioned to illuminate the target region, said lamp having first and second light output modes responding to first and second conditions of activation, said first light output mode providing light comprising principally a mixture of first and second colors and said second light output mode comprising principally light of said second color,
    activation control means connected to said lamp for cyclically applying said first and second conditions of activation thereto, and
    computational means responsive to the electronic images produced from light reflected from said target region during said first and second light output modes for producing first and second color-separated electronic images.

2. A color separation scanner, as defined in claim 1, further comprising a second fluorescent lamp positioned to illuminate said target region, said second lamp having first and second light output modes responding to alternate conditions of activation, said first light output mode of said second fluoreseent lamp providing light comprising a third color and said second light output mode of said second lamp comprising a substantial absence of said third color,
    further activation control means connected to said second lamp for cyclically applying said alternate conditions of activation thereto, and
    said computational means being further responsive to the electronic images produced from light reflected from said target region during said first and second light output modes of said second lamp for producing first, second and third color-separated electronic images.

3. A color separation scanner, as defined in claim 2, wherein said first color is red, said second color is blue, and said third color is green.

4. A color separation scanner, as defined in claim 1, wherein said fluorescent lamp comprises at least two essentially different phosphors, the first of which emits, upon excitation, light of said first color, and the second of which emits, upon excitation, light of said second color, and wherein the persistence of light emission of said second phosphor is substantially greater than the persistence of light emission of said first phosphor, and wherein said first condition of activation comprises the supply of light driving current to said fluorescent lamp and said second condition of activation comprises the absence of such driving current.

5. A color separation scanner, as defined in claim 1, wherein said target region comprises an elemental line, said transducer comprises a linear array of photosensors and wherein said fluorescent lamp comprises an elongated tube positioned adjacent to and parallel with said elemental line.

6. A color separation scanner, as defined in claim 2, wherein said target region comprises an elemental line, said transducer comprises a linear array of photosensors and wherein said fluorescent lamps each comprise an elongated tube positioned on either side and parallel with said elemental line.

7. A color separation scanner, as defined in claim 1, wherein said computational means subtracts the electronic image produced during said second light output mode from the electronic image produced during said first light output mode.

8. A color separation scanner, as defined in claim 2, wherein said computational means subtracts the electronic image produced during said second light output mode of the first said lamp from the electronic image produced during said first light output mode of the first said lamp and from the electronic image produced during said first light output mode of said second lamp.

* * * * *